US010187488B2

(12) United States Patent
Condict

(10) Patent No.: US 10,187,488 B2
(45) Date of Patent: Jan. 22, 2019

(54) METHODS FOR MANAGING REPLACEMENT IN A DISTRIBUTED CACHE ENVIRONMENT AND DEVICES THEREOF

(71) Applicant: NetApp, Inc., Sunnyvale, CA (US)

(72) Inventor: Michael Condict, Hurdle Mills, NC (US)

(73) Assignee: NetApp, Inc., Sunnyvale, CA (US)

( * ) Notice: Subject to any disclaimer, the term of this patent is extended or adjusted under 35 U.S.C. 154(b) by 802 days.

(21) Appl. No.: 14/630,997

(22) Filed: Feb. 25, 2015

(65) Prior Publication Data

US 2016/0246733 A1 Aug. 25, 2016

(51) Int. Cl.
*G06F 12/12* (2016.01)
*H04L 29/08* (2006.01)
*G06F 12/0802* (2016.01)
*G06F 3/06* (2006.01)
*G06F 12/121* (2016.01)

(52) U.S. Cl.
CPC ........ *H04L 67/2842* (2013.01); *G06F 3/0604* (2013.01); *G06F 3/067* (2013.01); *G06F 3/0611* (2013.01); *G06F 3/0629* (2013.01); *G06F 12/0802* (2013.01); *G06F 12/12* (2013.01); *G06F 12/121* (2013.01)

(58) Field of Classification Search
CPC .... G06F 12/12; G06F 12/0802; G06F 12/121; G06F 2212/1021; G06F 2212/154; G06F 2212/60; G06F 2212/69; G06F 3/0604; G06F 3/0611; G06F 3/0629; G06F 3/067
See application file for complete search history.

(56) References Cited

U.S. PATENT DOCUMENTS

| 6,266,742 B1* | 7/2001 | Challenger | G06F 12/123 711/133 |
| 6,633,891 B1* | 10/2003 | Bamford | G06F 12/0813 |
| 7,502,889 B2* | 3/2009 | Sistla | G06F 12/121 711/128 |
| 7,917,599 B1* | 3/2011 | Gopalan | H04L 67/2842 709/216 |
| 7,925,711 B1* | 4/2011 | Gopalan | H04L 67/1097 709/212 |
| 9,064,124 B1* | 6/2015 | Davis | G06F 21/606 |
| 9,166,862 B1* | 10/2015 | Davis | H04L 29/06047 |
| 2007/0156964 A1* | 7/2007 | Sistla | G06F 12/121 711/133 |
| 2009/0144388 A1* | 6/2009 | Gross | G06F 12/0813 709/213 |

(Continued)

*Primary Examiner* — Midys Rojas
(74) *Attorney, Agent, or Firm* — Cesari and McKenna, LLP

(57) ABSTRACT

A method, device, and non-transitory computer readable medium that manages replacement in a distributed cache environment includes determining a cache value of a new item associated with one of a plurality of I/O cache resources. A cache value of a least valuable other item in the plurality of I/O cache resources is obtained. A determination is made when the cache value of the new item is greater than the cache value of the least valuable other item in the plurality of I/O cache resources. The least valuable other item is replaced with the new item when the determination indicates the cache value of the new item is greater than the cache value of the least valuable other item.

18 Claims, 4 Drawing Sheets

(56) References Cited

U.S. PATENT DOCUMENTS

| | | | | |
|---|---|---|---|---|
| 2010/0281218 A1* | 11/2010 | Shen | ................ | G06F 12/127 |
| | | | | 711/125 |
| 2012/0054447 A1* | 3/2012 | Swart | ................ | G06F 12/0888 |
| | | | | 711/136 |
| 2012/0110108 A1* | 5/2012 | Li | ................ | H04L 67/2852 |
| | | | | 709/213 |
| 2013/0159347 A1* | 6/2013 | Klein | ................ | G06F 17/3048 |
| | | | | 707/771 |
| 2014/0082288 A1* | 3/2014 | Beard | ................ | G06F 17/30132 |
| | | | | 711/123 |
| 2014/0089559 A1* | 3/2014 | Cai | ................ | G06F 12/126 |
| | | | | 711/102 |
| 2014/0223107 A1* | 8/2014 | Sadok | ................ | H04N 21/23113 |
| | | | | 711/136 |

* cited by examiner

METHODS FOR MANAGING REPLACEMENT IN A DISTRIBUTED CACHE ENVIRONMENT AND DEVICES THEREOF

FIELD

This technology generally relates to methods and devices for managing cache and, more particularly, to methods for managing replacement in a distributed cache environment and devices thereof.

BACKGROUND

Increasingly, client-side input or output (I/O) caches are being employed on compute servers in order to decrease I/O latency to applications or to offload work from the expensive networked storage appliance to cheaper commodity hardware. The cost/performance ratio of this solution has two competing considerations as discussed below.

On one hand the storage media, e.g. flash memory, used to implement the I/O cache on the compute server is cheaper than the same cache-storage media in the storage appliance. It is also faster to access a cache on the computer server than on the storage appliance, since the network latency is eliminated. As a result, this argues for moving cache from the storage appliance where the cache is shared by all clients to the compute server where it is used locally to that server.

On the other hand, a set of isolated caches that do not share their cache storage will not have as high a hit rate as a single cache that combines the storage of all of them. This assumes that the working set sizes vary dynamically across the compute servers, so that at any given time, some of them are under-provisioned with client-side cache and some are over-provisioned resulting in inefficiencies.

Further with prior existing technology, attempts to manage cache have considered the use of a complex distributed data structure with elements spread across the cache cluster. Unfortunately, to maintain this complex distributed data structure would require one or more network messages each time an object in any cache was accessed which would be cumbersome and inefficient.

SUMMARY

A method for managing replacement in a distributed cache environment includes determining by a compute management server device a cache value of a new item associated with one of a plurality of I/O cache resources. A cache value of a least valuable other item in the plurality of I/O cache resources is obtained by the compute management server device. A determination is made by the compute management server device when the cache value of the new item is greater than the cache value of the least valuable other item in the plurality of I/O cache resources. The least valuable other item is replaced by the compute management server device with the new item when the determination indicates the cache value of the new item is greater than the cache value of the least valuable other item.

A compute management server device includes a memory coupled to a processor which is configured to be capable of executing programmed instructions comprising and stored in the memory to determine a cache value of a new item associated with one of a plurality of I/O cache resources. A cache value of a least valuable other item in the plurality of I/O cache resources is obtained. A determination is made when the cache value of the new item is greater than the cache value of the least valuable other item in the plurality of I/O cache resources. The least valuable other item is replaced with the new item when the determination indicates the cache value of the new item is greater than the cache value of the least valuable other item.

A non-transitory computer readable medium having stored thereon instructions for managing replacement in a distributed cache environment comprising executable code which when executed by a processor, causes the processor to perform steps including determining a cache value of a new item associated with one of a plurality of I/O cache resources. A cache value of a least valuable other item in the plurality of I/O cache resources is obtained. A determination is made when the cache value of the new item is greater than the cache value of the least valuable other item in the plurality of I/O cache resources. The least valuable other item is replaced with the new item when the determination indicates the cache value of the new item is greater than the cache value of the least valuable other item.

This technology provides a number of advantages including providing methods, non-transitory computer readable media, and computing devices that more effectively manage replacement in independent I/O cache resources in a distributed cache environment. In particular, this technology may globally optimize the choice of which I/O cache resource to store a data item based on determining the least valuable item that is currently in any of the cache resources and replacing that item with the new item. When making this determination, this technology may take into account the difference in latency-reduction value between remote and local caching as well as other types and numbers of weighting factors. With this technology, a higher cache hit rate is achieved with these cooperating independent I/O cache resources than they would have in isolation. Further with this technology, there is no need for a complex distributed data structure for finding the least valuable object. Instead with this technology the number of network messages necessary to determine the least valuable object is effectively minimized to a small number per second, rather than a number that is proportional to the number of object accesses.

DETAILED DESCRIPTION

Figure 1:
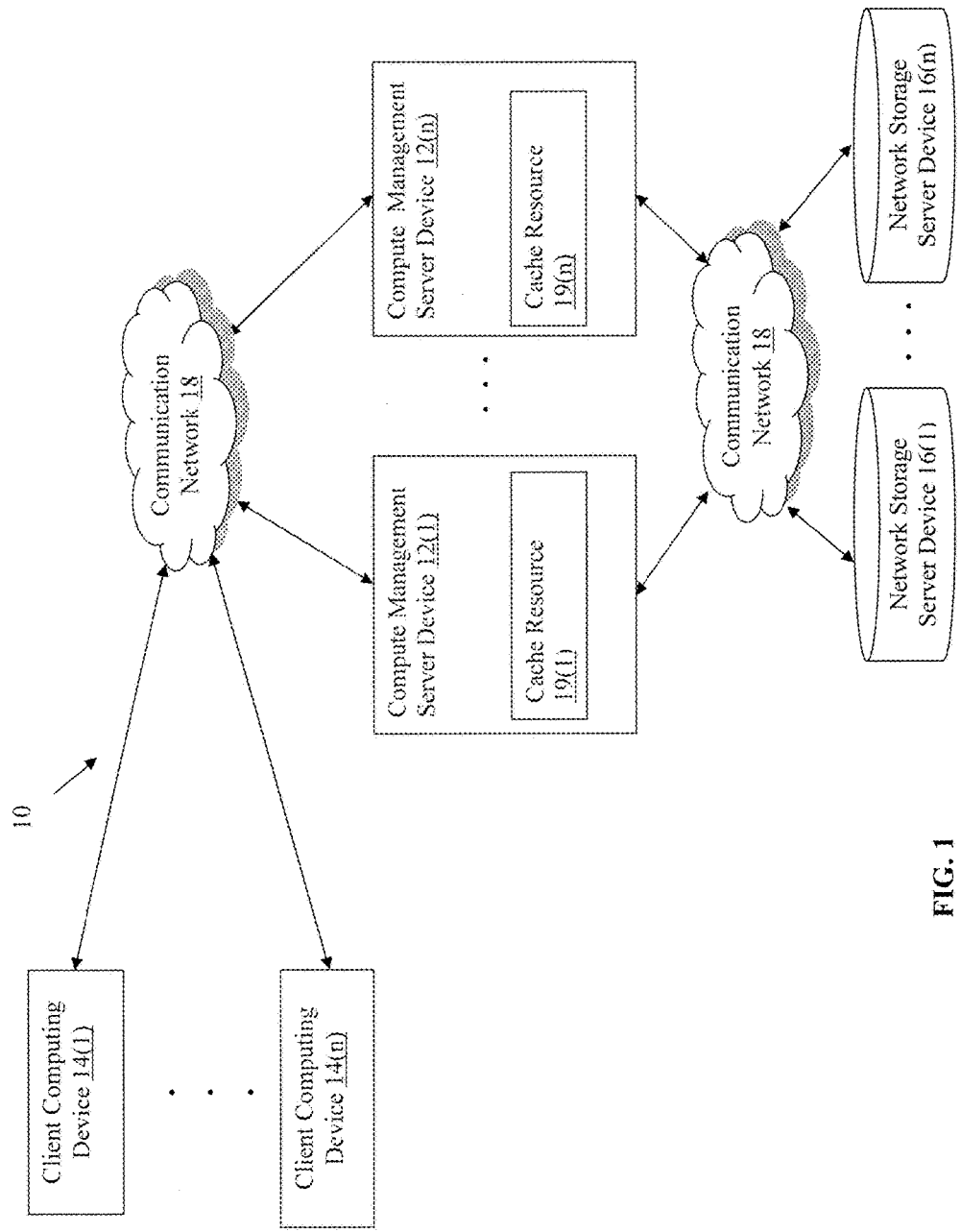
FIG. 1 is a block diagram of an environment with an example of compute management server devices that dynamically manage replacement in independent I/O cache resources in a distributed cache environment.
Figure 2:
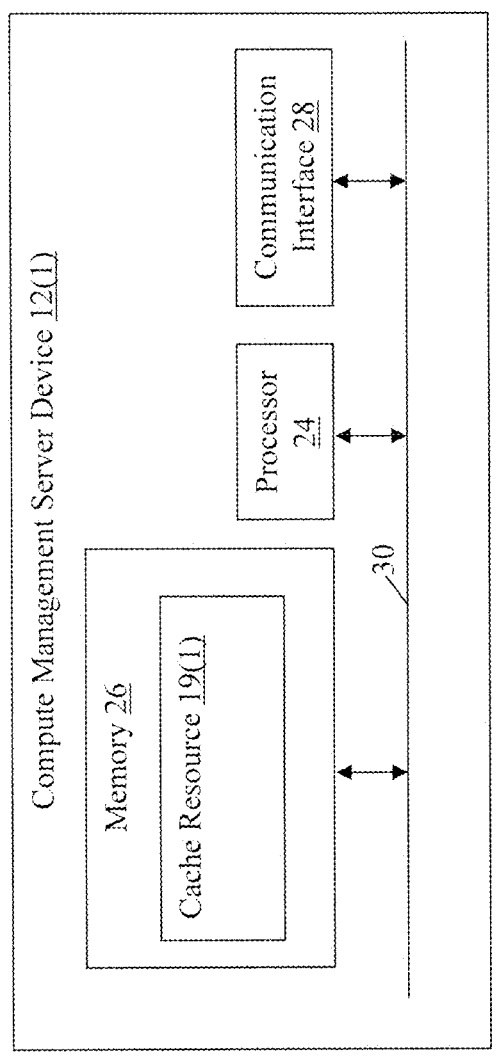
FIG. 2 is a block diagram of the example of the compute management server device shown in FIG. 1.

A distributed cache environment 10 with examples of compute management server devices 12(1)-12(n) is illustrated in FIGS. 1-2. In this particular example, the environment 10 includes compute management server devices 12(1)-12(n), client computing devices 14(1)-14(n), and network storage server devices 16(1)-16(n) coupled via one or more communication networks 18, although the environment could include other types and numbers of systems, devices, components, and/or other elements as is generally known in the art and will not be illustrated or described herein. This technology provides a number of advantages including providing methods, non-transitory computer readable media, and computing devices that more effectively manage replacement in independent I/O cache resources in a distributed cache environment.

Referring more specifically to FIGS. 1-2, each of the compute management server devices 12(1)-12(n) are used to manage replacement in independent I/O cache resources 19(1)-19(n) in a distributed cache environment 10 by way of example only, although other types and/or numbers of I/O cache resources could be managed. Additionally, in this particular example each of the storage controller computing devices 16(1)-16(n) represent physical machines used to manage I/O and other operations with the network storage server devices 16(1)-16(n), although other configurations, such as a virtual network with virtual machines could be used by way of example only.

In this particular example, each of the compute management server devices 12(1)-12(n) includes a processor 24, a memory 26, and a communication interface 28 which are coupled together by a bus 30, although each of the compute management server devices 12(1)-12(n) may include other types and/or numbers of physical and/or virtual systems, devices, components, and/or other elements in other configurations. For ease of illustration, only the compute management server device 12(1) is illustrated in FIG. 2, although in this particular example each of the other compute management server devices 12(2)-12(n) have the same structure and operation, although again each could have different structure and/or operations.

The processor 24 of in each of the compute management server devices 12(1)-12(n) may execute one or more programmed instructions stored in the memory 26 for managing replacement in a distributed cache environment as illustrated and described in the examples herein, although other types and numbers of functions and/or other operation can be performed. The processor 24 of in each of the compute management server devices 12(1)-12(n) may include one or more central processing units and/or general purpose processors with one or more processing cores, for example.

The memory 26 of in each of the compute management server devices 12(1)-12(n) stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. In this example, the memory 26 further includes one of the I/O cache resources 19(1)-19(n), although the memory may have other types and/or numbers of I/O cache resources and the distributed cache environment 10 may comprise other types and/or numbers of other I/O cache resources which could be used with this technology.

The communication interface 28 of in each of the compute management server devices 12(1)-12(n) operatively couples and communicates between, one or more of the other compute management server devices 12(1)-12(n), one or more of the client computing devices 14(1)-14(n) and one or more of the network storage server devices 16(1)-16(n), which are all coupled together by one or more of the communication networks 18, although other types and numbers of communication networks or systems with other types and numbers of connections and configurations to other devices and elements could be used, such as a connection to a server with a file on the current value of items in cache resources 19(1)-19(n). By way of example only, the communication networks 18 can use TCP/IP over Ethernet and industry-standard protocols, including NFS, CIFS, SOAP, XML, LDAP, SCSI, and SNMP, although other types and numbers of communication networks, can be used. The communication networks 18 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the client computing devices 14(1)-14(n) may run applications that may provide an interface to make requests for and receive content, such as data blocks, web pages, applications, and/or other information hosted by one or more of the network storage server devices 16(1)-16(n) via one or more of the compute management server devices 12(1)-12(n), although other types and/or numbers of operations or other functions could be performed.

The network storage server devices 16(1)-16(n) may store and provide content or other network resources in response to requests from the client computing devices 14(1)-14(n) via one or more of the compute management server devices 12(1)-12(n) and one or more of the communication networks 18, for example, although other types and numbers of storage media in other configurations could be used. In particular, the network storage server devices 16(1)-16(n) may each comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the network storage server devices 16(1)-16(n) and transmitting data (e.g., files or web pages) in response to requests from the client computing devices 14(1)-14(n).

Each of the client computing devices 14(1)-14(n) and each of the network storage server devices 16(1)-16(n) may include a processor, a memory, and a communication interface, which are coupled together by a bus or other link, although other numbers and types of devices and/or nodes as well as other network elements could be used.

Although the exemplary network environment 10 with the compute management server devices 12(1)-12(n), the client computing devices 14(1)-14(n), the network storage server devices 16(1)-16(n), and the communication networks 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An exemplary method for determining a value of a data item for or in storage in one of the independent I/O cache resources in the distributed cache environment will now be described with reference to FIGS. 1-3. With this example, the following definitions are used:

Let L_Local=the latency for a cache resource to fetch a data item from its local cache storage.

L_Remote=the latency for a cache resource to fetch a data item over the network from a remote cache.

L_Backend=the latency for a cache resource to fetch a data item from a backend network storage device.

Figure 3:
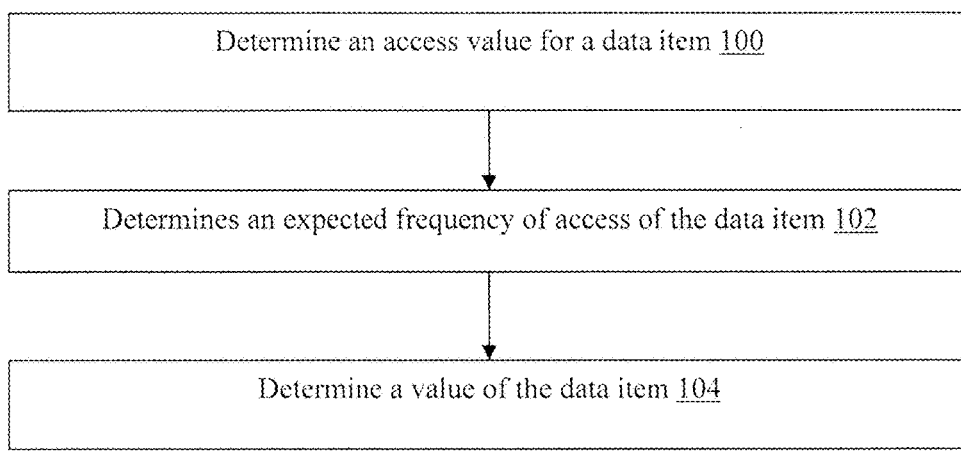
FIG. 3 is a flow chart of examples of methods for determining a value of a data item for or in storage in one of the independent I/O cache resources in the distributed cache environment.

Referring more specifically to FIG. 3, in this particular example in step 100, one of the compute management server devices 12(1)-12(n) determines an access value for a data item. In this particular example, let L_AccessValue(d)=the latency-reduction value of each access to a cached data item d, although other manners for determining or otherwise obtaining the access value could be used. If data item d is cached locally in one of the cache resources 19(1)-19(n) where it is used, then this is (L_Backend-L_Local), a positive value, because access to the local one of the cache resources 19(1)-19(n) is faster than going over the network to one of the backend network storage devices 16(1)-16(n). If cached remotely in other one of the cache resources 19(1)-19(n), then this is (L_Backend-L_Remote), which is presumably a smaller value, because of the use of the network to access the remote one of the cache resources 19(1)-19(n), but it is probably still a positive value, because access to a remote one of the cache resources 19(1)-19(n) is on the communication network 18 between compute server devices 12(1)-12(n), compared to the heavily used network path between the compute server devices 12(1)-12(n) and the backend network storage devices 16(1)-16(n). Also, the number of instructions executed by the remote one of the cache resources 19(1)-19(n) to fetch or store a data item is almost certainly a lot less than those executed by the backend network storage devices 16(1)-16(n), which is implementing much more sophisticated data management and the full semantics of a file system.

If in another example the goal is not necessarily to minimize average latency cluster wide, but rather to minimize storage cost for a given level of performance (i.e. cost per IOPS), then the example described above may be done differently. By way of example only, a factor proportional to the cost/GB of the storage in the one of cache resources 19(1)-19(n) is then multiplied by each of L_* latency numbers, in computing L_AccessValue(d), although other types and/or numbers of other factors could be used to determine access value. To further illustrate this example, if the cost of flash-based cache on the one of the backend network storage devices 16(1)-16(n) is 2 k per GB, where as it is 1 k per GB on the one of the remote cache resources 19(1)-19(n), then the computation may be:

$$L\_AccessValue(d)=(2*k*L\_Backend-k*L\_Remote)$$

The effect of this is that even if the latency of accessing one of the cache resources 19(1)-19(n) remotely is equal to the latency of accessing cached storage on one of the backend network storage devices 16(1)-16(n), the higher cost of the flash on the one of the backend network storage devices 16(1)-16(n) argues for there being value in storing the data in one of the cache resources 19(1)-19(n), instead.

Next, in step 102 the one of the compute management server devices 12(1)-12(n) determines an expected frequency of access of a data item which is used to normalize the access value across different replacement policies, workloads, and/or sizes of the cache resources 19(1)-19(n), although other manners for determining an access frequency and/or normalizing the access value could be used. In this particular example, let T_Median=the median time that data items stay in the cache resources 19(1)-19(n), given typical or recent workloads. Additionally, let Exp_Freq(d)=the number of times that cached item d is statistically expected to be accessed in time T_Median, computed from the value assigned to it by the local cache replacement policy. This may require each of the cache resources 19(1)-19(n) do a translation from the metadata that it uses to estimate value, to this global standard. The point of doing this is to normalize value across different replacement policies, workloads and sizes of the cache resources 19(1)-19(n). As an example, if one of the cache resources 19(1)-19(n) that is using an LRU replacement policy will need to translate the position in the LRU queue to an expected future frequency of access. Using a machine learning approach, this could be done by computing an average of the number of times that least-recently-used data items are accessed in time T_Median. This would require keeping track of usage of some items that have been evicted from the one of the cache resources 19(1)-19(n), but only for bounded periods, so it would be feasible to do so.

Next, in step 104 one of the compute management server devices 12(1)-12(n) determines a value of a data item. In this particular example, let Value(d)=Exp_Freq(d)*L_AccessValue(d), although other manners for determining or otherwise obtaining the value could be used. This definition says that the value of keeping an item d in each of the cache resources 19(1)-19(n) is the latency reduction for each access to data item d, multiplied by the number of times that d is expected to be accessed in the near future, which can reasonably be defined as the median amount of time that data items stay in the cache resources 19(1)-19(n).

Next, an example of a method for managing replacement in I/O cache resources in a distributed cache environment will now be described with reference to FIGS. 1-4. In this example, the distributed cache environment 10 comprises cooperating, but independent, I/O cache resources 19(1)-19(n) in the distributed cache environment 10 connected by a network, although this technology can work with other types and/or numbers of systems and/or other environments. Additionally, in this example cooperating indicates one of compute management server devices 12(1)-12(n) can use some network protocol to store and retrieve data in another one of the I/O cache resources 19(1)-19(n) in the distributed cache environment 10. Further in this example, the one of the compute management server devices 12(1)-12(n) also can cause the immediate eviction of any data item in any of the I/O cache resources 19(1)-19(n) which is necessary when an data item in the corresponding one of the network storage server devices 16(1)-16(n) is deleted.

Figure 4:
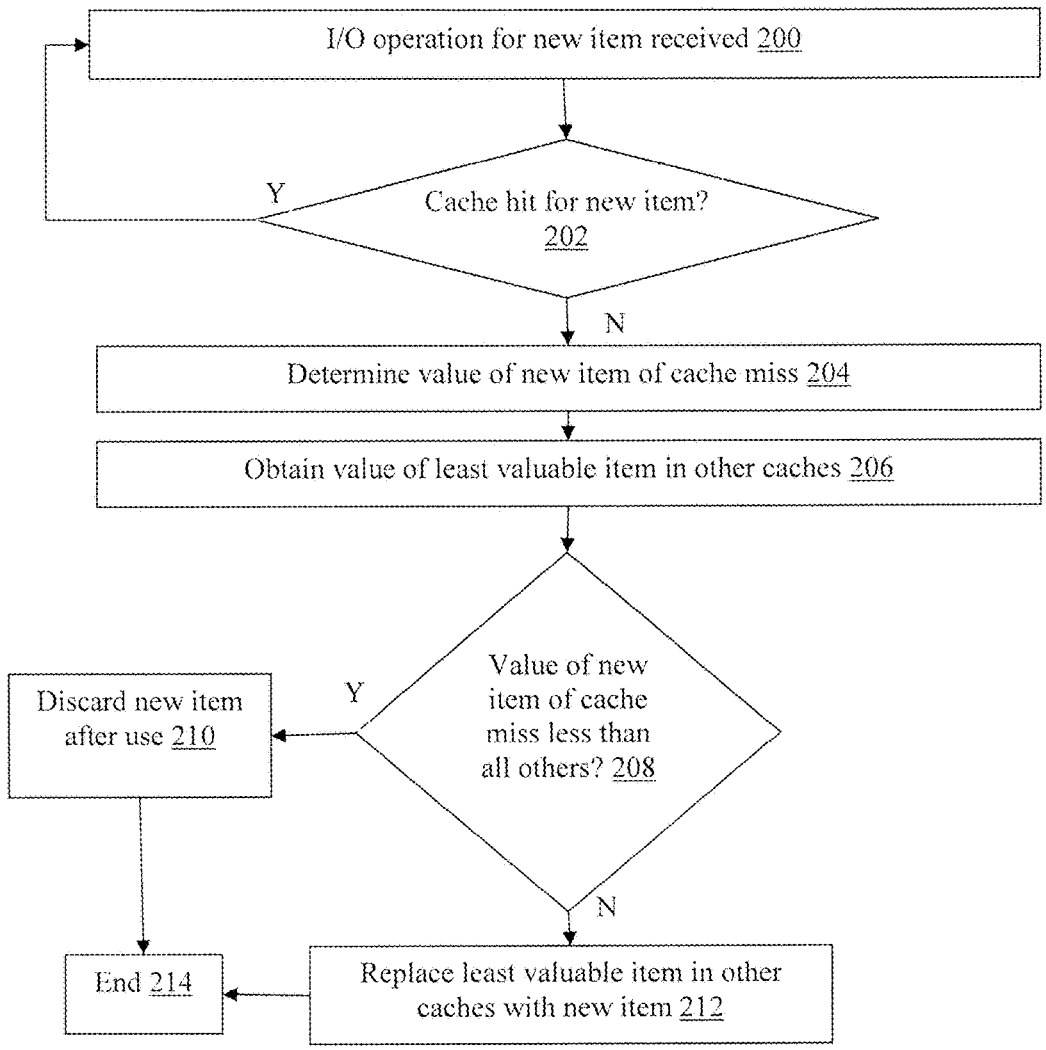
FIG. 4 is a flow chart of an example of a method for managing replacement in independent I/O cache resources in a distributed cache environment.

Referring more specifically to FIG. 4, in this example in step 200, one of the compute management server devices 12(1)-12(n) receives an I/O operation for a new item from one of the client computing devices 14(1)-14(n), although the I/O operations could be received from the other sources.

In step 202, the one of the compute management server devices 12(1)-12(n) determines whether there is a cache hit in the corresponding one of the I/O cache resources 19(1)-19(n). If in step 202, the one of the compute management server devices 12(1)-12(n) determines whether there is a cache hit in the corresponding one of the I/O cache resources 19(1)-19(n), then the Yes branch is taken back to step 200 to wait for the next I/O operation. If in step 202, the one of the compute management server devices 12(1)-12(n) determines whether there is not a cache hit in the corresponding one of the I/O cache resources 19(1)-19(n), then the No branch is taken back to step 204.

In step 204, the one of the compute management server devices 12(1)-12(n) determines the value of the new item. By way of example only, the examples of the methods for determining a value of each item in cache in the distributed cache environment illustrated and described with reference to FIG. 3 may be used, although other approaches for determining or otherwise obtaining the value could be used.

In step 206, the one of the compute management server devices 12(1)-12(n) obtains the value of the least valuable item in the I/O cache resources 19(1)-19(n) in the compute management server devices 12(1)-12(n) which in this example includes the one of the cache resources 19(1)-19(n) in the one of the compute management server devices 12(1)-12(n). By way of example only, one way to obtain these values is for each of the compute management server devices 12(1)-12(n) to periodically determine and then broadcast to the other ones of the compute management server devices 12(1)-12(n) the value of the least valuable item currently in the corresponding one of the I/O cache resources 19(1)-19(n), although other manner for the one of the compute management server devices 12(1)-12(n) to obtain these values could be used. By way of example only, each of the compute management server devices 12(1)-12(n) could periodically write to a file stored by a server or other computing or storage device that is shared over the communication network 18 connecting the compute management server devices 12(1)-12(n), allowing the one of the compute management server devices 12(1)-12(n) to read the shared file to obtain the values. This has the benefit that the values are pulled over the communication network 18 on demand, rather than being pushed every second, whether needed or not. Any of the I/O cache resources 19(1)-19(n) that may fail will simply stop providing this information on the values to the other the I/O cache resources 19(1)-19(n) which will then stop trying to store any data items in the one of the I/O cache resources 19(1)-19(n) which has failed. As result, with this example there will be no loss of functionality other than the latency-reduction benefit the failed one of the I/O cache resources 19(1)-19(n) was providing.

In step 208, the one of the compute management server devices 12(1)-12(n) determines whether the value of the new item is less than the value of the least valuable item in the I/O cache resource 19(1)-19(n) in the compute management server device 12(1)-12(n). If in step 208 the one of the compute management server devices 12(1)-12(n) determines the value of the new item is less than the value of the least valuable item in the I/O cache resource 19(1)-19(n) in the compute management server devices 12(1)-12(n), then the Yes branch is taken to step 210. In step 210 the one of the compute management server devices 12(1)-12(n) discards the new item after the I/O operation is completed and then in step 214 this example of the method may end.

If in step 208 the one of the compute management server devices 12(1)-12(n) determines the value of the new item is not less than the value of the least valuable item in the I/O cache resource 19(1)-19(n) in the compute management server devices 12(1)-12(n), then the No branch is taken to step 212. In step 212 the one of the compute management server devices 12(1)-12(n) replaces the least valuable item in the I/O cache resource 19(1)-19(n) in the compute management server devices 12(1)-12(n) with the new item.

Any of the I/O cache resources 19(1)-19(n) that has a data item replaced by another one of the compute management server devices 12(1)-12(n) is not obligated to keep that data item for any amount of time. The one of the I/O cache resources 19(1)-19(n) which had an item replaced may have a different replacement policy than the I/O cache resources 19(1)-19(n) which originally had the new item. As a result, the original one of the compute management server devices 12(1)-12(n) cannot predict how long the new item will be in the other one of the I/O cache resources 19(1)-19n) before the new item is evicted due to a replacement policy associated with the other one of the I/O cache resources 19(1)-19n) to make room for an incoming data item that is more valuable according to that policy. As a result, the one of the I/O cache resources 19(1)-19(n) in the one of the compute management server devices 12(1)-12(n) must be prepared to receive a 'not found' error when it attempts to retrieve an data item previously stored in another one of the cache resources 19(1)-19(n) and go to the corresponding one of the network storage devices 16(1)-16(n) to retrieve the item. Next, in step 214 this example of the method may end.

Accordingly, as described and illustrated by way of the description and examples herein, this technology provides methods, non-transitory computer readable medium and computing devices that more effectively manage replacement in independent I/O cache resources in a distributed cache environment. In particular, this technology may globally optimize the choice of which I/O cache resource to store a data item based on determining the least valuable item that is currently in any of the cache resources and replacing that item with the new item. When making this determination, this technology may take into account the difference in latency-reduction value between remote and local caching as well as other types and numbers of weighting factors. With this technology, a higher cache hit rate is achieved with these cooperating independent I/O cache resources than they would have in isolation. Further with this technology, there is no need for a distributed data structure for finding the least valuable object. Instead with this technology the number of network messages necessary to determine the least valuable object is effectively minimized to a small number per second, rather than a number that is proportional to the number of object accesses.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

computing, by a compute server device, a cache value of each of a plurality of items associated with one of a plurality of I/O cache resources, wherein the cache value for each item of the plurality of I/O cache resources is computed from a difference of (i) a remote latency for the respective item to fetch data from a remote cache and (ii) a backend latency for the respective item to fetch the data from a backend storage device, and wherein the cache value for each item is further scaled by a first scaling factor; and replacing, by the compute server device, a lesser valuable other item with a new item when the cache value of the new item is greater than the cache value of the lesser valuable other item.

2. The method as set forth in claim 1 wherein the first scaling factor is a cost per unit of storage.

3. The method as set forth in claim 1 wherein the first scaling factor is applied to the remote latency and a second scaling factor is applied to the backend latency.

4. The method as set forth in claim 1 wherein the first scaling factor representing a cost per unit of storage at the remote cache is applied to the remote latency and a second scaling factor different from the first scaling factor representing a cost per unit of storage at the backend storage device is applied to the backend latency.

5. The method as set forth in claim 1 wherein the cache value of the lesser valuable other item is obtained, by the compute server device, from a periodic broadcast from another one of the plurality of I/O cache resources of the cache value of the lesser valuable other item in the another one of the plurality of I/O cache resources.

6. The method as set forth in claim 1 wherein the cache value of the lesser valuable other item is obtained, by the compute server device, from a shared file.

7. An apparatus comprising:

a processor; and a memory coupled to the processor, the processor configured to execute programmed instructions stored in the memory to:

compute a cache value of each of a plurality of items associated with one of a plurality of I/O cache resources, wherein the cache value for each item of the plurality of I/O cache resources is computed from a difference of (i) a remote latency for the respective item to fetch data from a remote cache and (ii) a backend latency for the respective item to fetch the data from a backend storage device; and wherein the cache value for each item is further scaled by a first scaling factor; and replace a lesser valuable other item with a new item when the cache value of the new item is greater than the cache value of the lesser valuable other item.

8. The apparatus as set forth in claim 7 wherein the first scaling factor is a cost per unit of storage.

9. The apparatus as set forth in claim 7 wherein the first scaling factor is applied to the remote latency and a second scaling factor is applied to the backend latency.

10. The apparatus as set forth in claim 7 wherein the first scaling factor representing a cost per unit of storage at the remote cache is applied to the remote latency and a second scaling factor different from the first scaling factor representing a cost per unit of storage at the backend storage device is applied to the backend latency.

11. The apparatus as set forth in claim 7 wherein the cache value of the lesser valuable other item is obtained from a periodic broadcast from another one of the plurality of I/O cache resources of the cache value of the lesser valuable other item in the another one of the plurality of I/O cache resources.

12. The apparatus as set forth in claim 7 wherein the cache value of the lesser valuable other item is obtained from a shared file.

13. A non-transitory computer readable medium having stored instructions which when executed by a processor, causes the processor to perform steps comprising:

computing a cache value of each of a plurality of items associated with one of a plurality of I/O cache resources, wherein the cache value for each item of the plurality of I/O cache resources is computed from a difference of (i) a remote latency for the respective item to fetch data from a remote cache and (ii) a backend latency for the respective item to fetch the data from a backend storage device, and wherein the cache value for each item is further scaled by a first scaling factor; and;

replacing a lesser valuable other item with a new item when the cache value of the new item is greater than the cache value of the lesser valuable other item.

14. The medium as set forth in claim 13 wherein the first scaling factor is a cost per unit of storage.

15. The medium as set forth in claim 13 wherein the first scaling factor is applied to the remote latency and a second scaling factor is applied to the backend latency.

16. The medium as set forth in claim 13 wherein the first scaling factor representing a cost per unit of storage at the remote cache is applied to the remote latency and a second scaling factor different from the first scaling factor representing a cost per unit of storage at the backend storage device is applied to the backend latency.

17. The medium as set forth in claim 13 wherein the cache value of the lesser valuable other item is obtained from a periodic broadcast from another one of the plurality of I/O cache resources of the cache value of the lesser valuable other item in the another one of the plurality of I/O cache resources.

18. The medium as set forth in claim 13 wherein the cache value of the lesser valuable other item is obtained from a shared file.

* * * * *